United States Patent

[11] 3,586,759

[72] Inventor John D Ross
Dollard Des Ormeaux, Quebec, Canada
[21] Appl. No. 691,667
[22] Filed Nov. 13, 1967
[45] Patented June 22, 1971
[73] Assignee Central Cynamics, Ltd.
Pointe Claire, Montreal, Quebec, Canada
Continuation-in-part of application Ser. No. 626,520, Mar. 28, 1967, now abandoned.

[54] VIDEO CLIPPER CHROMA
19 Claims, 12 Drawing Figs.

[52] U.S. Cl. 178/5.4, 328/139
[51] Int. Cl. H04n 9/48
[50] Field of Search 178/5.4, 5.4 SY, 5.4 AC, 5.4 CR, 5.4 CD; 328/158, 135, 139; 178/7.3 S, 7.5 S; 307/237; 178/6

[56] References Cited
UNITED STATES PATENTS

| | | | |
|---|---|---|---|
| 3,167,611 | 1/1965 | St. John | 178/5.4 |
| 3,265,810 | 8/1966 | Falk | 178/5.4 |

*Primary Examiner*—Richard Murray
*Assistant Examiner*—John C. Martin
*Attorney*—Gerald J. Ferguson, Jr.

ABSTRACT: Solid state circuitry for clipping a television composite (luminance plus chrominance) color signal is disclosed whereby the amplitude of the luminance signal is limited to preset voltage levels corresponding to blanking level and peak white without clipping the chrominance signal which for certain saturated colors exceeds the luminance clipping level. The circuitry modulates the clipping circuit with chrominance information of precisely the same phase and amplitude as the chrominance modulation on the video signal so that the clipping circuit is desensitized during excursions of the chrominance modulation to values more negative than the black clip level. Thus, whenever the chrominance signal exceeds the luminance clipping level, the clipping circuit does not affect the chrominance portion of the composite color signal. A band-pass filter is used to extract the chrominance signal. To eliminate distortion of the chrominance signal filter output during the blanking interval, a gate is provided at the output of the filter, the gate being operated at the beginning of the blanking interval and thereby effectively preventing any distortion from reaching the clipping circuitry during this time.

INVENTOR
JOHN D. ROSS

BY Gerald J. Ferguson Jr.
ATTORNEY

INVENTOR
JOHN D. ROSS

BY Gerald J. Ferguson Jr.
ATTORNEY

INVENTOR
JOHN D. ROSS

BY Gerald J. Ferguson Jr.
ATTORNEY

VIDEO CLIPPER CHROMA

This application is a continuation-in-part of applicant's copending application Ser. No. 626,520, now abandoned, entitled Video Clipper Chroma, and filed Mar. 28, 1967.

CROSS-REFERENCES TO RELATED APPLICATIONS

The clipping circuitry of this invention may be included in video signal processing circuitry, which is described in a United States application entitled "Video Signal Processor," which has been assigned Ser. No. 673,678 and filing date Oct. 9, 1967.

BACKGROUND OF THE INVENTION

This invention relates to clipping circuits and, in particular, to clipping circuits wherein the clipping circuit is rendered inoperative whenever certain predetermined portions of the input signal exceed the clipping level.

One of the prior art approaches to this problem has been to separate the luminance and chrominance signals using a band stop filter and a band-pass filter respectively, each filter being centered at the color subcarrier frequency. The luminance signal is clipped and then recombined with the chrominance signal to obtain a clipped composite (chrominance plus luminance) color signal. However, after recombination of the signals, considerable distortion occurs because of imprecise matching of the characteristics of the above-mentioned band stop and band-pass filters and because of spurious signals developed from the high frequency components of portions of the luminance signal after it has been clipped.

SUMMARY

Thus, it is a primary object of this invention to provide improved clipping circuitry whereby the clipping circuitry is rendered inoperative whenever predetermined portions of the input signal thereto exceed the clipping level.

It is a further object of this invention to provide improved circuitry for clipping a television composite color signal so that the amplitude of the luminance signal is limited to preset voltage levels corresponding to blanking level and peak white, without clipping the chrominance signal which for certain saturated colors exceeds the luminance clipping level.

It is a further object of this invention to provide an improved clipping circuit, as mentioned above, where the chrominance signal is extracted from the composite signal to thereby render the clipping circuit inoperative whenever the chrominance signal exceeds the luminance clipping level, the chrominance signal being extracted with a minimum amount of distortion thereof.

It is a further object of this invention to provide improved clipping circuit for a color television signal wherein the output from the clipping circuit, during the blanking interval, does not contain synchronizing pulses, color burst signals, or any distortion.

Other objects and advantages of this invention will become apparent upon reading the appended claims in conjunction with the following detailed description and the attached drawings.

DESCRIPTION OF THE PREFERRED EMBODIMENT

Figure 1:
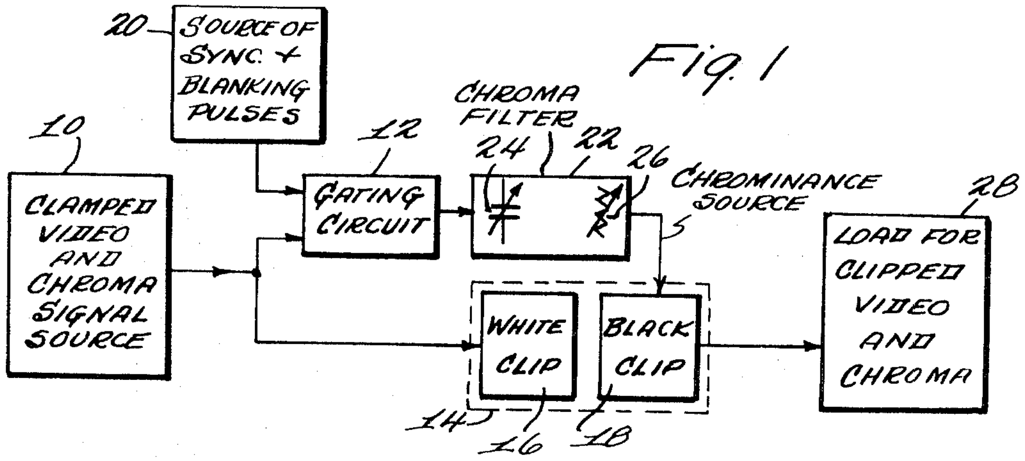
FIG. 1 is a block diagram which illustrates a preferred embodiment of the invention.

Referring to FIG. 1, there is shown a source 10 of clamped composite (chrominance plus luminance) color signals which are applied to inhibitor circuit 12 and clipping circuit 14, which includes a white clip circuit 16 and a black clip circuit 18.

The output signal from inhibitor 12 is applied to filter 22 for filtering therefrom the chrominance signal which is applied to black clip circuit 18. The chrominance signal modulates the black clip circuit so that the clipping circuit is desensitized during excursions of the chrominance modulation to values more negative than the black clip level. The chrominance signal could also be applied to the white clip circuit; however, this generally is not necessary since in practice desaturation of the chrominance signal occurs approaching peak white limits of the video signal and the loss of color saturation due to white clipping is negligible.

In order to insure the desired result at the black clip circuit, the phase and amplitude of the chrominance signal applied from filter 22 must be substantially the same as that of the chrominance modulation of the composite color video signal. Means for obtaining this correspondence in the phase and amplitude relations are well known to those having ordinary skill in this art. Typically, variable capacitor means 24 and potentiometer means 26 diagrammatically indicated at filter 22 may be employed to obtain the desired phase and amplitude relations. The output signal from clip circuit 18 is applied to load 28 for the clipped composite color signal.

Inasmuch as the color burst and the sync and blanking pulses of the composite signal have frequency components which fall within the frequency range of the chrominance signal, these components must not be applied to filter 22 so that the chrominance signal only is applied to black clip circuit 18. This is accomplished by applying to inhibitor 12 sync and blanking pulses from source 20, the signals from source 20 being in time synchronism with the sync and blanking pulses occurring in the composite signal at the output of source 10. Thus, the signal applied to filter 22 corresponds to the composite signal from source 10 without sync and blanking pulses.

As is described in more detail in the copending application entitled "Video Signal Processor" by the same inventor, the clipping circuitry described in this application is part of a larger system for processing video signals; thus, the sync pulses and the color burst signals appearing in the composite output signal from source 10 are usually deteriorated to the point where they must be replaced by signals of the proper shape. Hence, it is necessary to remove the sync pulses and color burst signals from the signal applied to load 28 prior to insertion of the new sync pulses and color burst signals. This, as stated above, is accomplished by the gating pulses applied from source 20.

Figure 3:
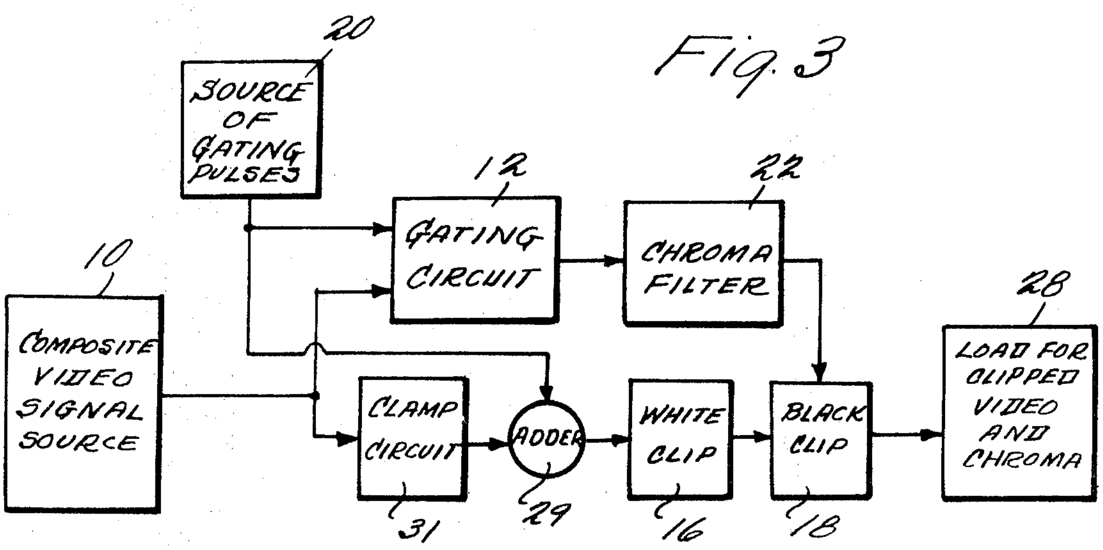
FIG. 3 is a block diagram which illustrates a preferred, modified embodiment of the invention.
Figure 4A:
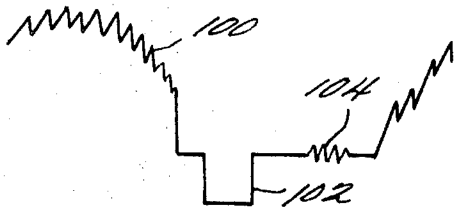
FIGS. 4A—4E illustrate typical waveforms which occur in the embodiment of FIG. 3.
Figure 4B:
Figure 4C:
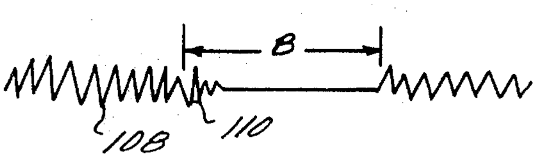
Figure 4D:
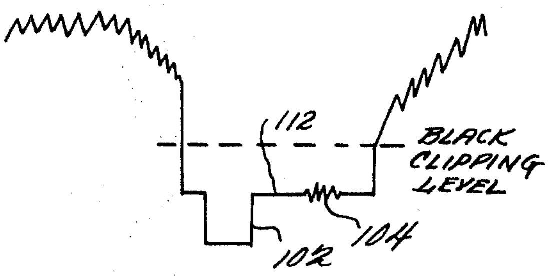

However, the particular arrangement of the embodiment of FIG. 1 may introduce undesirable disturbances into the blanking interval portion of the signal applied to load 44. This will be shown in reference to FIG. 3, which is essentially the same as FIG. 1 except for slight modifications. Thus, the only differences between FIGS. 1 and 3 are (1) the connection of blanking pulses from source 20 to adder 29 and (2) the insertion of the clamping circuit 31 before the adder 29. The purpose of the clamping circuit is to fix the back porch of the composite signal at the blanking level. Note that in FIG. 1, the source 10 indicates that the signal is already clamped. Referring to FIGS. 4A—4E, which illustrate typical waveforms at various points in the circuitry of FIG. 3, the operation of the FIG. 3 circuit will now be described. FIG. 4A illustrates a typical waveform from source 10. This composite signal includes a video portion 100, a sync pulse 102, and a color burst signal 104. As stated above, the sync pulse and color burst signal are usually deteriorated as a result of passage through many prior stages of processing. Thus, the gating pulse 106 of FIG. 4B is applied to gate 12 and adder 29, to effectuate the removal of these signals from the signal that is eventually applied to load 28. As stated hereinbefore, the application of the gating pulse to gate 12 removes the sync pulse and the color burst from the output of gate 12 and hence, the output from chroma filter 12 is as shown in FIG. 4C, the chrominance signal being illustrated at 108 and the blanking interval being indicated as B. Note the occurrence of the distortion 110 occurring at the leading edge of the blanking interval. This distortion results since the filter 22 usually does not settle down until a predetermined interval of time (typically 0.3 microseconds) after the blanking interval commences.

Figure 4E:
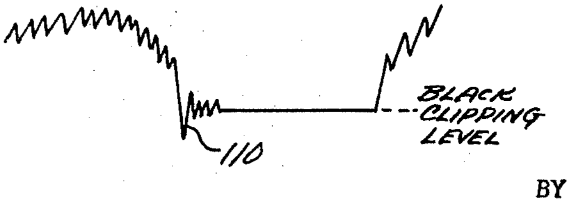

As stated above the gating pulse 106 is also applied to adder 29. The composite signal of 4A is also applied to the adder, the output of the adder being illustrated in FIG. 4D. The addition of the gating pulse 106 causes the DC levels of the sync pulse 102 and the color burst 104 to be changed to a value substantially less than the black clipping level of clip circuit 18 and thus, the output signal from black clip circuit 18, during the blanking interval, will always be the blanking level 112 (as established by circuit 18) modified by any output which may occur during the blanking interval from the chroma filter 22. As stated above, the distortion 110 of FIG 4C occurs during the blanking interval and, thus, this distortion appears in the output signal from clip circuit 18, as shown in FIG. 4E. Since this distortion may interfere with the new synchronizing pulse which is added to the blanking level 112 (see the before-mentioned copending U.S. application), it must be eliminated.

Figure 5:
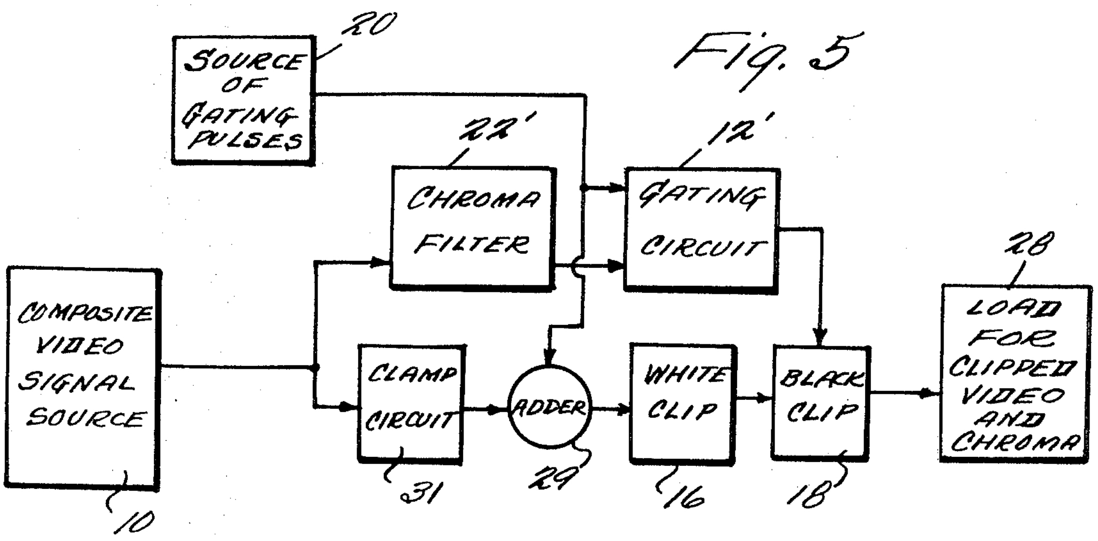
FIG. 5 illustrates a further preferred, modified embodiment of the invention.

Circuitry effective for accomplishing this function is shown in FIG. 5, the circuitry of FIG. 5 being similar to that of FIG. 3, the only differences being the nature of filter 22 and the location of gate 12. The filter 22 of FIG. 1 is a band-pass filter, which passes the chrominance portion of the composite signal to black clip circuit 18. However, the filter 22′ of FIG. 5 not only includes the band-pass capability of FIG. 1 but also a high pass filtering capability so that all frequencies below 500 kilohertz are effectively eliminated and the output at, typically, 1.5 megahertz is down 3 db. The function of this high pass filtering is (1) to remove the low frequency components from the chroma channel (filter 22′ and gate 12′) and (2) to improve the phase response (and thus transient response) of the chroma channel. Note also the gate 12′ is located after the filter 22′ while the gate 12 is located before filter 22 in FIG. 1.

Figure 6A:
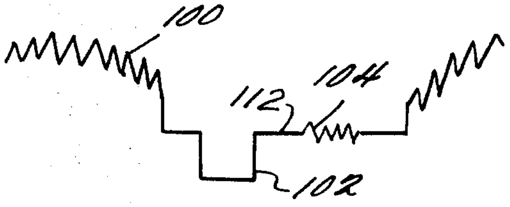
FIGS. 6A—6C illustrate typical waveforms which occur in the chroma channel of the embodiment of FIG. 5.
Figure 6B:
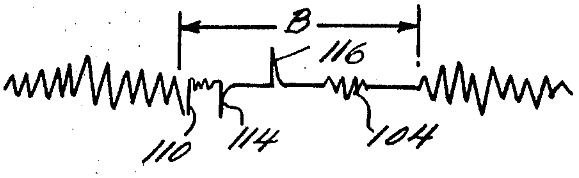
Figure 6C:
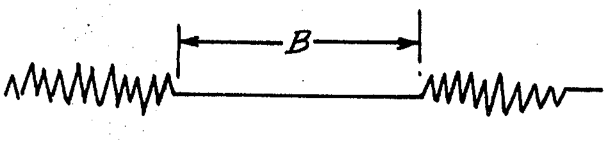

The operation of the circuitry of FIG. 5 will now be described in relation to FIGS. 6A—6C, which show the signal waveforms occurring in the chroma channel. FIG. 6A illustrates the composite waveform which is applied to filter 22′ and clamping circuit 31. The output from filter 22′ is shown in FIG. 6B. Note the distortion 110 is also present in the blanking interval B as is the case with the output from the filter 22 of FIG. 3, as is shown in FIG. 4C. However, because the gate 12′ follows filter 22′, the output from gate 12′ does not contain the distortion 110, as shown in FIG. 6C. Also, of course, the spikes 114 and 116 (resulting from the differentiation of sync pulse 102) and the color burst 104 are removed from the chroma filter 22′ output signal. Thus, as can readily be seen from FIG. 6C, the blanking interval is absolutely clean and hence the output signal from black clip circuit 18 will also have a clean blanking interval since the operation of the luminance channel (clamp 31, adder 29, white clip 16, and black clip 18) is the same as that described hereinbefore for the circuitry of FIG. 3.

It should be noted that even if the gating pulse from source 20 is delayed more than 0.3 microseconds (for example) with respect to the beginning of the blanking interval, the blanking interval of the output signal from black clip circuit 18 will still be distortion-free since the gating pulse from source 20 will also be delayed by the same amount of time before it is added at adder 29. That is, after the blanking interval starts, the output from adder 29 will be at the blanking level (as established by clamp 31) until the gating pulse starts. And thus, since the distortion 110 will produce a signal more negative than the blanking level, the output from black clip circuit is determined by the blanking level output from adder 29 during this initial period of the blanking interval; keeping in mind that the more positive of the two signals applied to black clip circuit 18 always appears at its output.

Also, although disturbances may occur on the trailing edge of the blanking interval as a result of the chroma channel processing, these effects, in practice, can be considered negligible. This usually results from the fact that the video portion of the composite signal normally starts up at a faster rate than any distortion which might be introduced at the trailing edge. Thus, for the purpose of clarity the drawings do not show any distortion at the trailing edge of the blanking interval.

Figure 2:
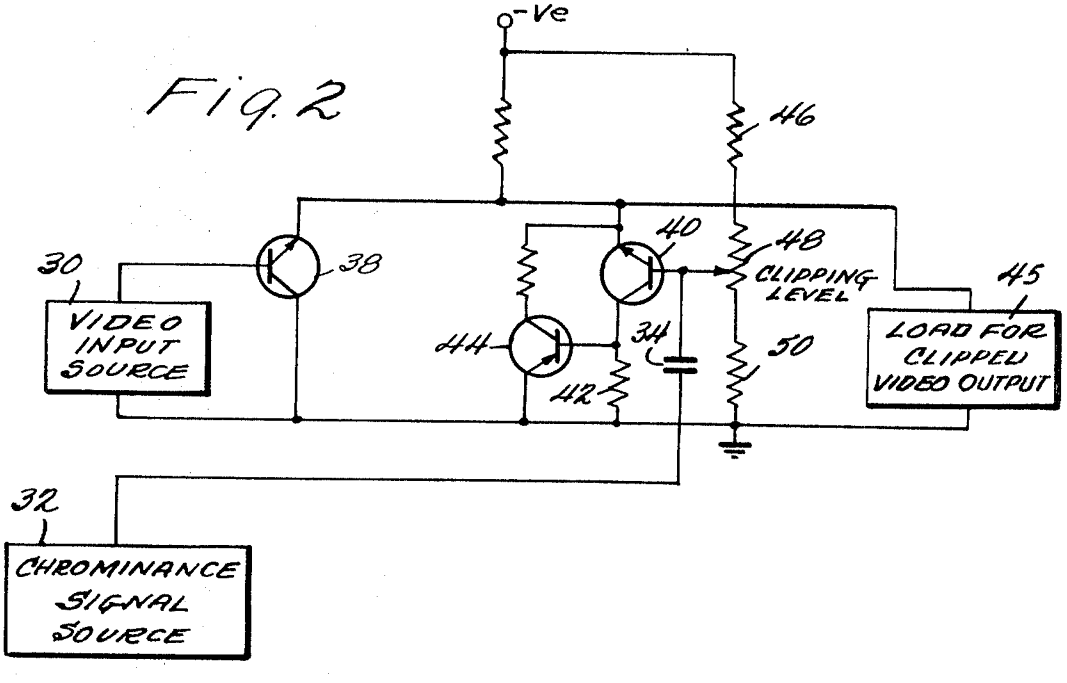
FIG. 2 is a schematic diagram of one portion of the block diagram shown in FIG. 1.

Reference should now be made to FIG. 2 which is a schematic diagram of the black clip circuit 18 shown in FIG. 1. This circuit is essentially the same as the circuit shown in FIG. 3 of Canadian application Ser. No. 986,624, filed Mar. 30, 1967, entitled "Video Clipper Monochrome," by the same inventor of the present application, and assigned to the same assignee. Alternative embodiments are also shown in the above-mentioned copending application in FIGS. 4 and 5 thereof. These also may be employed with this invention. In FIG. 2 of the present invention, there is shown a source 30 which corresponds to the source 10 shown in FIG. 1 and a source 32 which corresponds to filter 22 of FIG. 1. Source 32 is connected to the base of transistor 40 via capacitor 34. The only difference between the circuit of FIG. 2 of the present application and the circuit of FIG. 3 of the above-mentioned application is the connection of chrominance signal source 32 and capacitor 34 to the base of transistor 40. As will be seen hereinafter, this difference is of paramount importance.

The operation of the circuit shown in FIG. 2 has been described in detail in the above-mentioned application. However, the operation thereof will also be briefly described here. Transistors 38 and 40 may be regarded as a difference amplifier wherein, as long as the input signal from source 30 is positive with respect to the potential at the base of transistor 40, transistor 38 behaves as a standard emitter follower and exhibits the almost linear characteristic normally associated with this type circuit. However, input signal excursions more negative than the base potential at transistor 40 cause the base emitter junction of transistor 40 to become forward biased. As soon as this occurs, the negative signal excursion is amplified by transistor 40 and the voltage drop across resistor 42 causes the base emitter junction of transistor 44 to be sharply forward biased. As transistor 44 conducts, the potential at the emitter of transistor 40 follows the potential at the base of transistor 40 by the action of the feedback loop comprising transistors 40 and 44. The output signal is taken from the emitters of transistors 38 and 40 and applied to load 45, which corresponds to load 28 of FIG. 1. If chrominance signal source 32 were not present, the potential at the base of transistor 40 would be established by resistor 46, potentiometer 48, and resistor 50. Thus, the negative clipping level of the luminance signal is established by the setting of potentiometer 48 since the potential at the emitter of transistor 40 becomes fixed at constant value determined by the potentiometer setting whenever the input signal from source 30 is more negative than the transistor 40 base potential.

With the addition of chrominance signal source 32, the potential at the base of transistor 40 is caused to go more negative than the value established by potentiometer 48 whenever the chrominance signal modulation of the composite color signal applied from source 30 would cause the emitter of transistor 40 to go more negative than the value established at the base of transistor 40 by potentiometer 48. When this does occur, the separate chrominance signal from source 32 effectively follows the chrominance signal modulation of the composite signal applied from source 30 and thus the base emitter junction of transistor 40 is reverse biased during this time, since the separated chrominance signal is combined with or added to the clipping level reference signal established by potentiometer 48. Hence, transistor 38 continues to operate as a standard emitter follower whenever the chrominance signal exceeds the luminance clipping level established at the base of transistor 40 by potentiometer 48.

Transistor 44 is employed in the clip circuit of FIG. 2 to insure rapid switching action whenever the luminance portion of the composite color signal is more negative than the black clipping level established by potentiometer 48 and thereby substantially reduce distortion of the clipped luminance signal near the clipping level. However, for purposes of the present invention, the presence of transistor 44 is not mandatory. That is, the essential purpose of the present invention is to clip a first portion or component (the luminance signal) of a composite signal while at the same time not clipping a second portion or component (the chrominance signal) of the composite signal whenever the second component exceeds in absolute magnitude the clipping level established for the first component. The connection of chrominance signal source 32 to the base of transistor 40 will accomplish this function regardless of the presence of transistor 44. However, as is clearly brought out in the before-mentioned Canadian application, the presence of transistor 44 result in significant reduction of distortion of the luminance signal near the clipping level.

Still numerous other modifications of the invention will become apparent to one of ordinary skill in the art upon reading the foregoing disclosure. During such a reading, it will be evident that this invention has provided a unique circuitry for accomplishing the objects and advantages, and even further modifications will be apparent from this disclosure. It is to be understood, however, that the foregoing disclosure is to be considered exemplary and not limitative, the scope of the invention being defined by the following claims.

The embodiments of the invention in which an exclusive property or privilege is claimed are defined as follows:

I claim:

1. A circuit for clipping a composite signal having a first component and a second component whereby the first component is clipped whenever it exceeds in absolute magnitude a clipping level and whereby a second component of said composite signal is not clipped whenever it exceeds in absolute magnitude said clipping level, said circuit comprising:
 means for separating said second component from said composite signal;
 means responsive to said composite signal for clipping said composite signal whenever said first component exceeds in absolute magnitude the said clipping level, said clipping means including means for establishing said clipping level; and
 means responsive to said separated second component for desensitizing said clipping means whenever said second component exceeds in absolute magnitude said clipping level.

2. A clipping circuit, as in claim 1, where said composite signal is a television color signal and said first component is the luminance signal modulation and said second component is the chrominance signal modulation of said composite signal.

3. A clipping circuit for composite signals having at least first and second components, said circuit comprising:
 a source of said composite signals;
 means responsive to said composite signal for separating therefrom said second component;
 means for clipping said composite signal whenever said first component exceeds in absolute magnitude the clipping level reference signal established by said clipping means; and
 means for combining said separated second component with said clipping level reference signal to prevent said clipping means from clipping said composite signal when said second component exceeds in absolute magnitude said reference value.

4. A clipping circuit as in claim 3 where said combining means causes the absolute value of said clipping level reference signal to be increased by an amount equal to the absolute value of said separated second component thereby preventing the second component of said composite signal from being clipped.

5. A clipping circuit, as in claim 3, including means for keeping the phase and amplitude of said separated second component the same as the phase and amplitude of the second component of said composite signal.

6. A clipping circuit, as in claim 3, where said clipping means includes difference amplifier means, one input of which is responsive to said composite signal and the other input of which is responsive to said clipping level reference signal and said separated second component.

7. A clipping circuit, as in claim 3, where said composite signal is a color television signal, said first component is the luminance signal modulation and said second component is the chrominance signal modulation of the video portion of said composite signal.

8. A clipping circuit, as in claim 7, where said composite color television signal includes synchronizing pulses and color burst signals and where said clipping circuit includes means for removing said synchronizing pulses and color burst signals from said composite signal before it is applied to said means for separating said chrominance signal from said composite signal.

9. A clipping circuit, as in claim 7, where said clipping level corresponds to the blanking level of said luminance signal.

10. A clipping circuit, as in claim 7, where said composite color signal includes synchronizing pulses and color burst signals and where said clipping circuit includes means for removing said synchronizing pulses and color burst signals from the output signal from said means for separating said chrominance signal from said color composite signal.

11. A clipping circuit, as in claim 10, where said removing means includes
 a source of gating pulses which occur substantially synchronously with the blanking interval of said color composite signal and
 gating means responsive to said gating pulses for preventing said synchronizing pulses and color burst signals from being applied to said clipping means.

12. A clipping circuit as in claim 7, where said means for separating said chrominance signal from said composite color signal includes filter means which includes
 1. a band-pass portion for said chrominance signal and
 2. a high pass portion which substantially eliminates all frequencies below 500 kilohertz.

13. A clipping circuit as in claim 12 where said high pass portion of the filter means is down approximately 3 db. at 1.5 megahertz.

14. A clipping circuit as in claim 3 where said composite signal also includes
 1. a first portion which includes said first and second components and
 2. a second portion which must be removed, said second portion containing frequency components approximately equal in value to the frequency of the said second component, said first and second portions of the composite signal occurring alternately in time, and said clipping circuit including:
 a source of gating pulses which occur approximately at the same time as the said second portion of the composite signal; and
 gating means responsive to said gating pulses for preventing said second portion from being applied to said clipping means.

15. A clipping circuit as in claim 14 where said composite signal is a color television signal, said first portion is the video signal and said second portion is the blanking interval of said color composite signal.

16. A clipping circuit as in claim 15 where said first component is the luminance signal modulation of said video signal and where said second component is the chrominance signal modulation of said video signal.

17. A clipping circuit as in claim 16 where said clipping level corresponds to the blanking level of said luminance signal.

18. A clipping circuit as in claim 17 including means for adding said gating pulses to color composite signal so that the DC levels of the synchronizing pulses and the color burst signals of said color composite signal are changed to a value substantially less than the said clipping level of said clipping means, the output of said adding means being applied to said clipping means so that the output from said clipping means during the blanking interval of said color composite signals has removed therefrom said last-mentioned synchronizing pulses, color burst signals, and any distortion which might be produced by said means for separating the chrominance signal from the composite color signal.

19. A clipping circuit as in claim 18 including means for clamping said color composite signal to said blanking level prior to its application to said adder means.